(12) United States Patent
Kliskey (10) Patent No.: US 6,527,033 B1
(45) Date of Patent: Mar. 4, 2003

(54) TIRE BEAD BREAKING WEDGE AND METHOD

(75) Inventor: Roger Lee Kliskey, Brimfield, OH (US)

(73) Assignee: Summit Tool Company, Akron, OH (US)

( * ) Notice: Subject to any disclaimer, the term of this patent is extended or adjusted under 35 U.S.C. 154(b) by 0 days.

(21) Appl. No.: 09/895,124

(22) Filed: Jul. 2, 2001

(51) Int. Cl.⁷ .............................................. B60C 25/04
(52) U.S. Cl. ....................................... 157/1.3; 157/1.17
(58) Field of Search ......................... 157/1.3, 1.1, 1.17; 254/104, 120, 131; 7/100, 143, 146, 147

(56) References Cited

U.S. PATENT DOCUMENTS

| | | | | |
|---|---|---|---|---|
| 2,311,789 A | * | 2/1943 | Taylor .......................... | 157/1.3 |
| 2,399,146 A | * | 4/1946 | Schumann .................... | 157/1.3 |
| 3,587,121 A | * | 6/1971 | Morrow ........................ | 74/145 |
| 3,717,193 A | * | 2/1973 | Craft ............................ | 157/1.3 |
| 5,971,052 A | * | 10/1999 | Kliskey ........................... | 157/1 |

OTHER PUBLICATIONS

Ken–Tool Catalog, Catalog KT 0201, p. 11. (2001).

* cited by examiner

Primary Examiner—Joseph J. Hail, III
Assistant Examiner—David B. Thomas
(74) Attorney, Agent, or Firm—Renner, Kenner, Greive, Bobak, Taylor & Weber

(57) ABSTRACT

A a tire bead breaking tool is disclosed comprising a handle and a wedge head. The shaft is configured having a gripping portion, a shield portion, and a working portion at a forward end. The working portion is configured having an oblong cross-section comprising protruding opposite end surfaces and substantially less protruding opposite lateral surfaces disposed between the end surfaces. The working portion of the handle is press fit into a circular bore of a tool head and contacts sidewalls defining the bore along the handle protruding end surfaces. The wedge head is configured having an elongate wedge arm extending forward to a rounded terminal edge. A protrusion extends outward from the wedge arm and is offset rearward from the forward wedge arm edge. The protrusion includes a beveled leading surface terminating at an outer edge. Operation of the wedge includes positioning the wedge arm terminal edge between a wheel rim and tire bead; establishing a first region of contact between the wedge arm and the tire bead; moving the wedge arm downward a first distance to engage the wedge arm protrusion against an inboard portion of the tire bead whereby establishing a second region of contact; and moving the wedge arm downward a second distance to press the tire bead downward at the first and second regions of contact.

26 Claims, 6 Drawing Sheets

TIRE BEAD BREAKING WEDGE AND METHOD

TECHNICAL FIELD

The present invention relates generally to handled utility tools and, more specifically, to a tire bead breaking wedge and method for the use thereof.

BACKGROUND ART

Tire bead breaking wedges are known in the art and are in commercial use. Such tools generally comprise an elongate handle affixed at one end to a wedge head. The wedge head comprises an elongate body, typically formed from cast metal, having a striking surface at one end and a wedge edge at an opposite end. A circular cross-sectional through-bore extends through the tool head at a location representing the center of mass.

The handle for the subject type of tool is generally elongate, cylindrical configuration extending from a gripping end to an inverted frustro-conical forward end. The handle may be of wood, metal, plastic, or a composite composition. The forward end of the handle may further be coated with a rubber or other high coefficient of friction material.

Assembly of the wedge head to the handle is achieved by inserting the handle gripping end downward through the head bore until the forward end of the handle enters the bore of the head. The dimension of the forward end of the frustro-conical handle portion is oversized relative to the head bore. Accordingly, driving the frustro-conical handle portion downward into the bore of the head wedges the forward portion of the handle into the bore and establishes a tight, frictional press fit connection between the handle and wedge head.

In use, the user positions the working edge of the tool between a wheel rim and tire bead. Thereafter, a hammer is applied to the striking surface, serving to drive the wedge edge downward and thereby forcing the wedge edge against an underedge of the wheel rim. Using the wheel rim as a fulcrum, the handle is rotated and causes the wedge arm to impinge against the tire bead and force the bead downward. The downward pressure of the wedge arm upon the tire bead is continued until the bead of the tire is depressed a sufficient distance so as to disengage from the wheel rim. Should the bead prove resistant, a user of the bead-breaking wedge will typically pry the wedge head back and forth until engagement between the bead and the wheel rim is broken. Subsequent thereto, the wedge arm is extracted from between the tire bead and the wheel rim. Such extraction can prove difficult and require prying the wedge back and forth to effectuate its disengagement.

A bead breaking wedge of the aforementioned type is commercially sold as a Model 35329 wedge and T11E head by Ken-Tool Company, of 768 E. North Street, Akron, Ohio 44305. While the implement works well and has met with considerable commercial success, it has been found that rocking the wedge back and forth against the tire bead can, over time, cause the handle forward end portion to work its way loose from the wedge head, requiring a re-tightening by the user. Still further, repeated rocking action of the wedge head relative to the handle may act to frictionally wear away the portions of the inverted frustro-conical handle end lying along the wedge head longitudinal axis until only the lateral sides of the forward handle end remain in frictional engagement with the wedge head. In this condition, the wedge head may become free to rock backward and forward about the lateral sides of the forward handle end, "play" that is undesirable to the intended purpose of the tool. Eventually, the head will become loose from the handle and a retightening will be required. However, once the handle forward portion becomes worn to a considerable degree, a re-tightening of the handle to the tool head in known tools becomes increasingly problematic.

In order to postpone, if not eliminate, loosening between the handle forward end and the wedge head, handle manufacturers have incorporated ribs along the inverted frustro-conical outer surface of the forward handle end. The ribs engage circular sidewalls defining the wedge head bore. As the tool is used, the ribs wear away at a slower pace and a positive frictional engagement between the head and the handle is prolonged. The ribs, however, are of narrow width dimension making the area of surface to surface contact between the handle end and the wedge head less than desired. In addition, though occurring at a slower pace, the ribs will eventually wear away. When the ribs are gone, the handle and wedge head will loosen in the manner described above. A repeated retightening of the wedge head connection with the handle will be increasingly required and over time, re-tightening, as explained above, becomes increasingly problematic.

A second deficiency in known handles for tire bead breaking wedges is that it is common for a user to inadvertently contact the wheel rim with a portion of the tool during the tire bead breaking procedure. Such repeat contact can, in time, cause a structural failure of the handle proximate the wedge head. In addition, the handle gripping area in known tools is generally smooth and regular. Establishing and maintaining a tight grip upon the tool handle can become increasingly difficult as the user becomes fatigued.

Yet a further deficiency is that a considerable amount of force is generally required to force the tire bead downward a distance sufficient to disengage from the wheel rim. Since the wedge contacts the tire bead at only one point of contact, i.e. the working end of the wedge arm, all of the requisite downward force is concentrated upon only one area of the tire bead. The magnitude of force necessary to deflect one area of the tire bead downward a sufficient distance is greater than optimally desired. In addition, impinging upon the tire bead with a relatively large force at only one point of engagement can damage the tire bead. Still further, once the tire bead is disengaged from the wheel rim, the wedge working edge typically sticks between the tire bead and the wheel rim. Dislodging the wedge edge from its position between the rim and the bead requires considerable prying, an arduous effort that slows the process and fatigues the user of the tool.

Accordingly, there is a need for a tire bead-breaking tool having a head to handle frictional connection that will not degrade or become disconnected from repeated use of the tool over time. Moreover, the wedge head should provide means for efficiently depressing the tire bead downward during the bead breaking procedure, requiring a minimal amount of force. Still further the force required to break the bead should be applied in such a manner as not to damage the tire. Finally, the wedge head should facilitate a ready extraction of the wedge edge from between the rim and the tire bead once the bead breaking procedure is complete with a minimal amount of prying required.

SUMMARY OF THE INVENTION

It is, therefore, an object of the invention to provide a handle for a utility tool that establishes and maintains a positive frictional engagement with the tool head.

A further object is to provide a tire bead breaking wedge that requires a minimal level of efficiently applied force to depress the tire bead a sufficient distance from the wheel rim so as to disengage.

Yet a further object is to provide a tire bead breaking wedge that minimizes damage to the tire bead during the tire bead breaking procedure.

Another object of the invention is to provide a tire bead breaking wedge that facilitates a ready extraction of the wedge lever arm from between the tire bead and the wheel rim once the procedure is finished.

A further object of the invention is to provide a tire bead breaking wedge that provides a positive and efficient application of mechanical advantage through the wedge arm to the tire bead.

Additionally, it is an object of the invention to provide a method for efficiently and safely separating a tire bead from a wheel rim with minimal risk of damage to the tire.

A further object is to provide a tire bead breaking wedge that is economically and readily manufactured.

The aforementioned objectives, and other objectives that will be apparent to one skilled in the art, are achieved by a tool described and claimed below. The handle comprises an elongate gripping portion stepping at a forward shoulder to a shield portion having a thicker dimension than the gripping portion. An inverted frustro-conical handle working portion is connected to a forward end of the shield portion and is configured oblong in cross-section having protruding opposite end surfaces and substantially less protruding lateral surfaces disposed between the end surfaces.

The working portion of the handle wedges within an oval in cross-section through-bore of a wedge head and establishes positive frictional engagement between the protruding surfaces and tool head bore sidewalls. The protruding surfaces align and face along the longitudinal plane of the wedge head and use of the tool serves to drive the protruding surfaces into the bore, whereby reinforcing the frictional connection between the handle and the tool head. Less protruding lateral sides of the handle working end are separated from the sides of the tool head bore by gaps avoid contact therewith.

The wedge head comprises an elongate arm extending to a forward terminal wedge edge. A bead breaking protrusion is positioned offset a rearward distance from the wedge edge and projects outward from the wedge arm. The protrusion comprises a beveled leading edge and a beveled trailing edge intersecting at a rounded edge. The method of utilizing the tool includes inserting the wedge edge between the tire bead and wheel rim, and driving the wedge arm edge against a free edge of the wheel rim. The wedge arm is thereafter driven downward a second distance until the wedge arm protrusion engages an inboard portion of the tire bead. Thereafter, using the wheel rim as a fulcrum, the wedge arm is rotated downward by the handle and first and second points of engagement are established against the tire bead by the wedge arm and the arm protrusion, respectively. Continuing to leverage the wedge arm against an underside of an edge of the wheel rim, the wedge arm is rotated a further distance downward, pressuring the tire bead downward at the first and second areas of engagement, until separation of the tire bead from the wheel rim is complete.

The invention as summarized above is described in detail below and illustrated by the accompanying drawings.

DETAILED DESCRIPTION OF THE INVENTION

Figure 1:
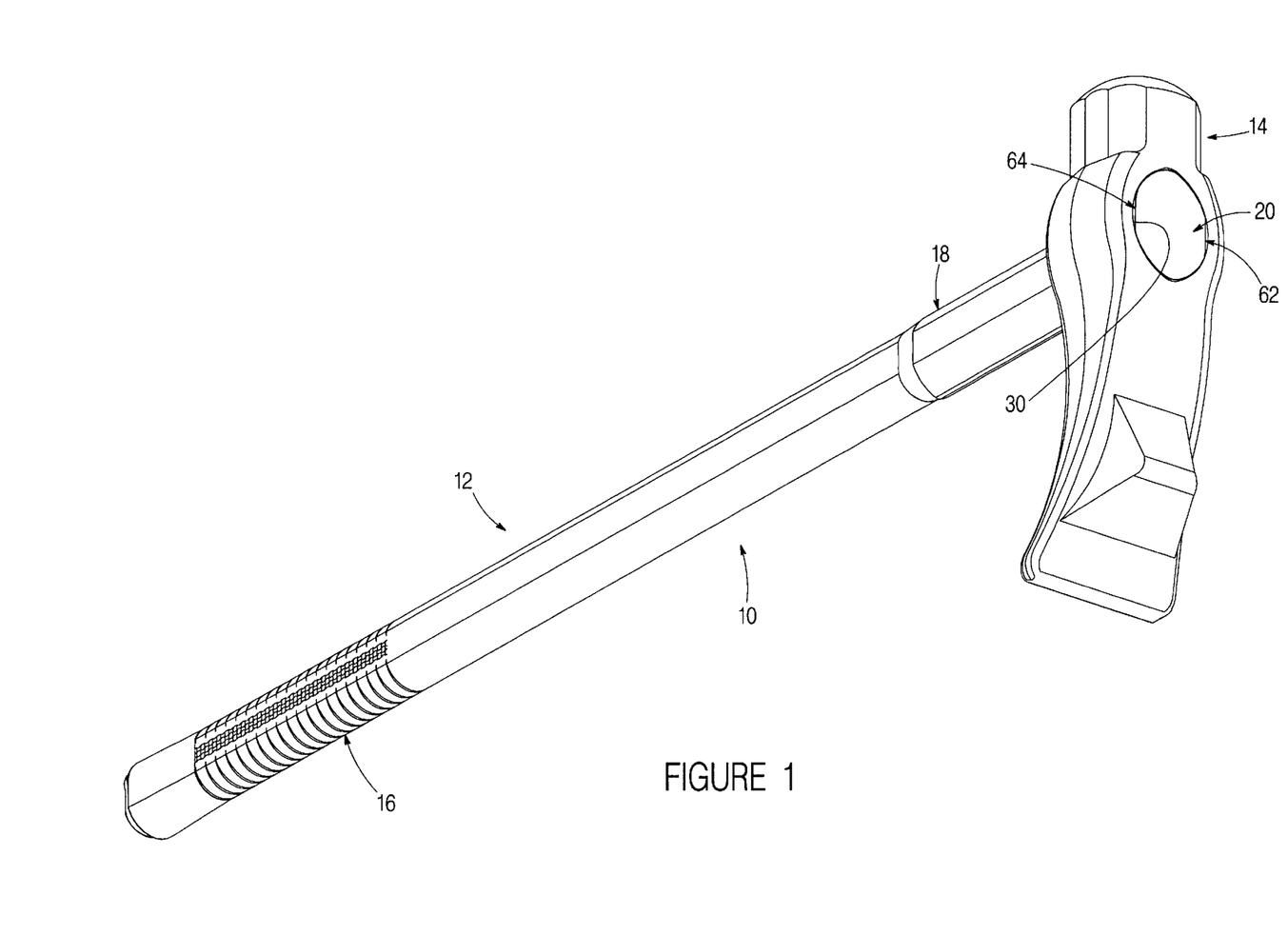
FIG. 1 is a left front perspective view of a tire bead-breaking wedge and handle configured pursuant to the subject invention.
Figure 2:
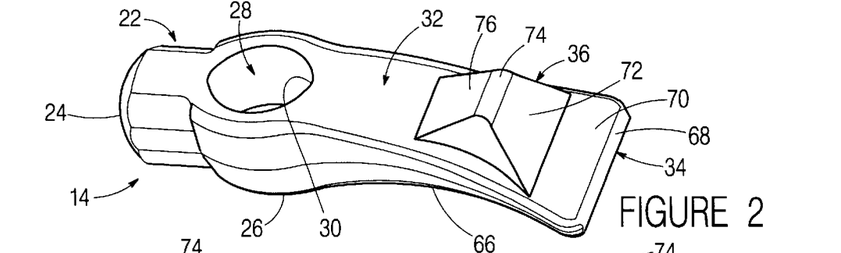
FIG. 2 is a right front perspective view of the wedge head configured pursuant to a the invention.
Figure 3:
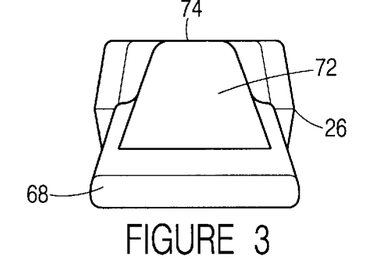
FIG. 3 is a front elevational view of the subject wedge head.
Figure 4:
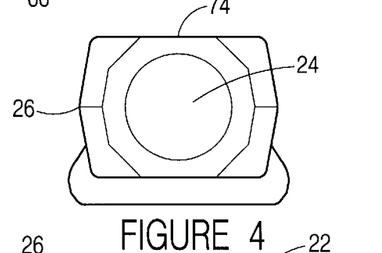
FIG. 4 is a rear elevational view thereof.
Figure 9:
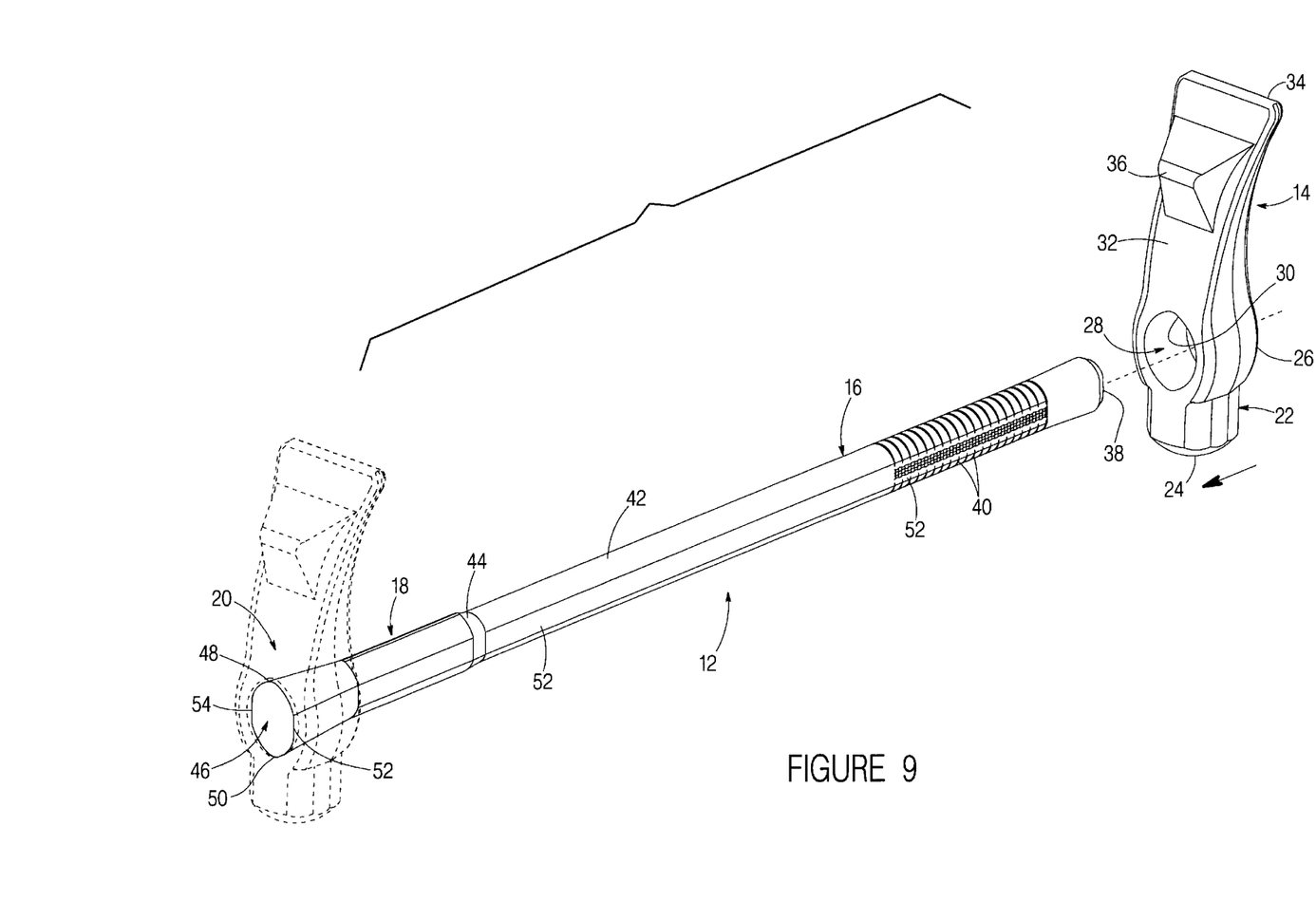
FIG. 9 is an exploded perspective view of the subject tire bead breaking tool.

Referring initially to FIGS. 1 and 9, a tire bead-breaking wedge 10 is shown to generally comprise an elongate handle 12 and a wedge head 14 transversely mounted to an end of the handle 12.

The handle 12 is of preferably unitary construction, although a handle formed of attached component parts may be substituted if so desired without departing from the teachings of the present invention. The handle 12 includes a gripping portion 16 that steps outward into a shield portion 18. Shield portion 18, in turn, merges into a generally inverse frustro-conically shaped working portion 20. The head 14 of the tool 10 is elongate in a longitudinal direction and comprises an anvil end 22 that terminates at a hammer-striking surface 24. A connector socket 26 is disposed at the center of mass of the head 14, and comprises an oval cross-section through-bore 28 defined by smooth sidewalls 30. A lever arm 32 extends forward from the bore 28 to a terminal wedge edge 34. A pyramidal tire bead-depressing protrusion 36 projects outward from the lever arm 32 proximate to the wedge edge 34. The head 14 is preferably of unitary construction, formed of cast iron or other suitably hard material.

Referring more specifically to the handle 12, and with reference to FIGS. 1 and 9, the gripping portion 16 extends from a rearward butt end 38 and includes a series of ridges 40 formed along an outer surface of the portion 16. Ridges 40 provide the user with a positive grip. The gripping portion 16 proceeds forward along a handle mid-portion 42 to an annular shoulder 44. Extending forward from the shoulder 44 is the handle shield portion 18 that merges with the forward most handle-working portion 20. Working portion 20 terminates at a forward end surface 46.

The configuration of the subject will be appreciated from a collective consideration of FIGS. 1 and 9. The handle working portion 20 is configured to have a generally oblong cross-section, comprising opposite protruding end surfaces 48, 50 and less protruding lateral surfaces 52, 54 disposed to extend along opposite sides of the working portion 20 between end surfaces 48, 50. While the lateral surfaces 52, 54 are preferably substantially flat, such surfaces may be formed into alternative shapes so long as end surfaces 52, 54 protrude outwardly substantially less than end surfaces 48, 50 for reasons explained below. By way of example, without any intention of constituting an exhaustive list of alternatives, surfaces 52, 54 may be formed to be slightly convex or concave if desired.

The working portion 20 of the handle 12 is composed preferably of rubber material 56. Other materials having a sufficiently high coefficient of friction and requisite resiliency, however, may be substituted if desired. At the merger of working portion 20 with the shield portion 18, the handle 12 preferably assumes a composite construction of an external sheath composed of polyethylene material and an inner core composed of fiber glass material. Other materials may be substituted if desired or the handle 12 may be formed from a single material if desired.

The composite composition of handle 12 continues to the rearward end 38. In addition, it will be noted that the opposite lateral surfaces 52, 54 beginning at the working portion 20 continue down the sides of the handle 12 to the reward end 38. Flat surfaces 52, 54 thus serve to vary the smooth circumferential geometry of the gripping portion 16. Ridges are created at the joinder of the flat surfaces 52, 54 and end surfaces 48, 50 along the length of handle 12. The surfaces 52, 54 and ridges create an uneven external handle circumference that allows the user of the handle to establish and maintain a positive grip upon the handle 12. The handle 12, as with the working portion 20, is oblong in cross-section and includes in the preferred embodiment the uneven circumferential geometry shown. While it is desirable to extend the lateral surfaces 52, 54 along the gripping portion 16 for the reasons explained above, the flat lateral surfaces 52, 54 may be confined to the working portion 20 if so desired and the remainder of the handle 12 may be formed having alternative sectional geometries if desired. By way of example, without representing an exhaustive list, the gripping portion 16 may be created having a circular or oval cross-section if desired.

The working end 20 assembles into the tool head 14 as will be understood from FIGS. 1 and 9. The handle is inserted gripping portion 16 first through the oval throughbore 28 of the head 14. The gripping portion 16 and the shield portion 18 are dimensioned to feed through the bore 28 with clearance. The protruding ends 48, 50 of the working end 20 are oriented along the longitudinal plane of the head member 14. That is, surfaces 48 faces the striking surface 24 of head 14 and the surface 50 faces the wedge edge 34. The working end 20 is press fitted into the through bore 28 of head 14 until a friction fit between surfaces 48, 50 and bore sidewalls 30 prevents further inward movement of the handle. So wedged, the engagement between the surfaces 48, 50 and sidewalls 30 secures the head 14 to the handle 12 and affords the user optimal mechanical advantage when the tool is utilized.

It will be appreciated that gaps 62, 64 are formed between the lateral surfaces 52, 54 of working portion 20 and sidewalls 30 of the bore 28. The gaps 62, 64 are oriented transverse to the longitudinal plane of the head 14. The flat (less protruding) configuration of the lateral surfaces 52, 54, created by the oblong sectional configuration of the working portion 20, facilitates the formation of the gaps 62, 64.

The configuration of the wedge head 14 will be understood from a collective consideration of FIGS. 2–7. As explained previously, the head 14 comprises a rearward anvil end 22 terminating at a generally square striking surface 24. Disposed at the center of mass of the head 14 is the oval connector socket 28 defined by sidewalls 30. The lever arm 32 extends forwardly from the socket 38 and terminates at the wedge edge 34. A bead depressing protrusion 36 projects outward from the lever arm 32 and is offset a distance rearward from the terminal arm edge 34. The offset distance may vary according to the invention at the option of the user.

Figure 5:
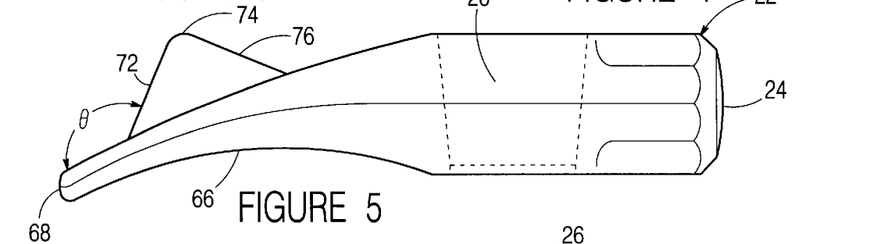
FIG. 5 is a right side elevational view thereof, the opposite side being of mirror image.
Figure 6:
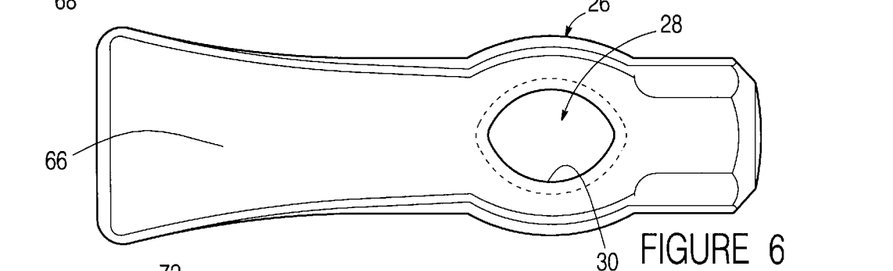
FIG. 6 is a bottom plan view thereof.
Figure 7:
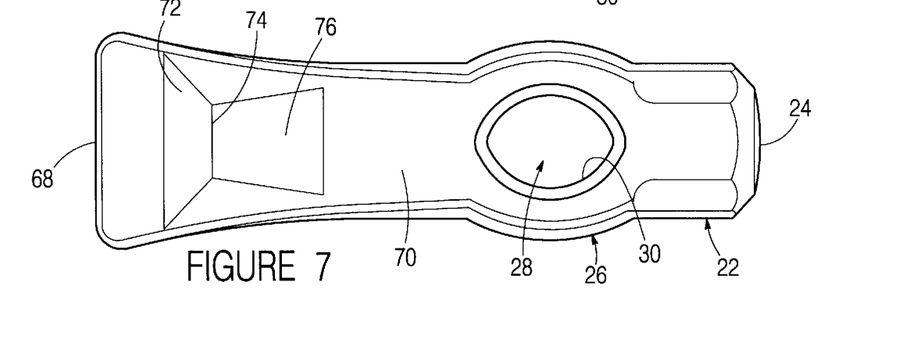
FIG. 7 is a top plan view thereof.

Continuing with reference to FIGS. 2–7, the wedge head lever arm 32 is specifically constructed having a curved, downwardly concave, lower surface 66 that arches upward from the socket 26 to the arm edge 34. The arm edge 34 is preferably rounded as shown at numeral 68. The lever arm 32 further comprises a generally flat upper surface 70 extending rearward at a slight incline from the edge 34 back to the socket 26. The upper surface 70 slightly downturns toward the edge 34 so that the edge 34, when the arm 32 is inverted during its operation, will catch an underside of a wheel rim edge as explained below. It is from the upper surface 70 that the protrusion 36 projects. Protrusion 36 is generally of a pyramidal wedge-shape, formed having a rearwardly inclined leading surface 72 and forwardly inclined trailing surface 76 that meet along a rounded upper edge 74. Protrusion 36 is formed in side elevation as substantially an equilateral triangle although the angles between surfaces of the protrusion may be varied without departing from the scope of the invention. As an equilateral triangle, the leading surface 72 of protrusion 36 forms an angle θ of one hundred twenty degrees with the upper surface 70 of lever arm 32 as shown in FIG. 5. The head 14 is formed preferably of unitary construction from cast metal such as iron or steel. However, head 14 may be formed of alternative, suitably strong materials and may be formed as an assembly of component parts if so desired.

Figure 8A:
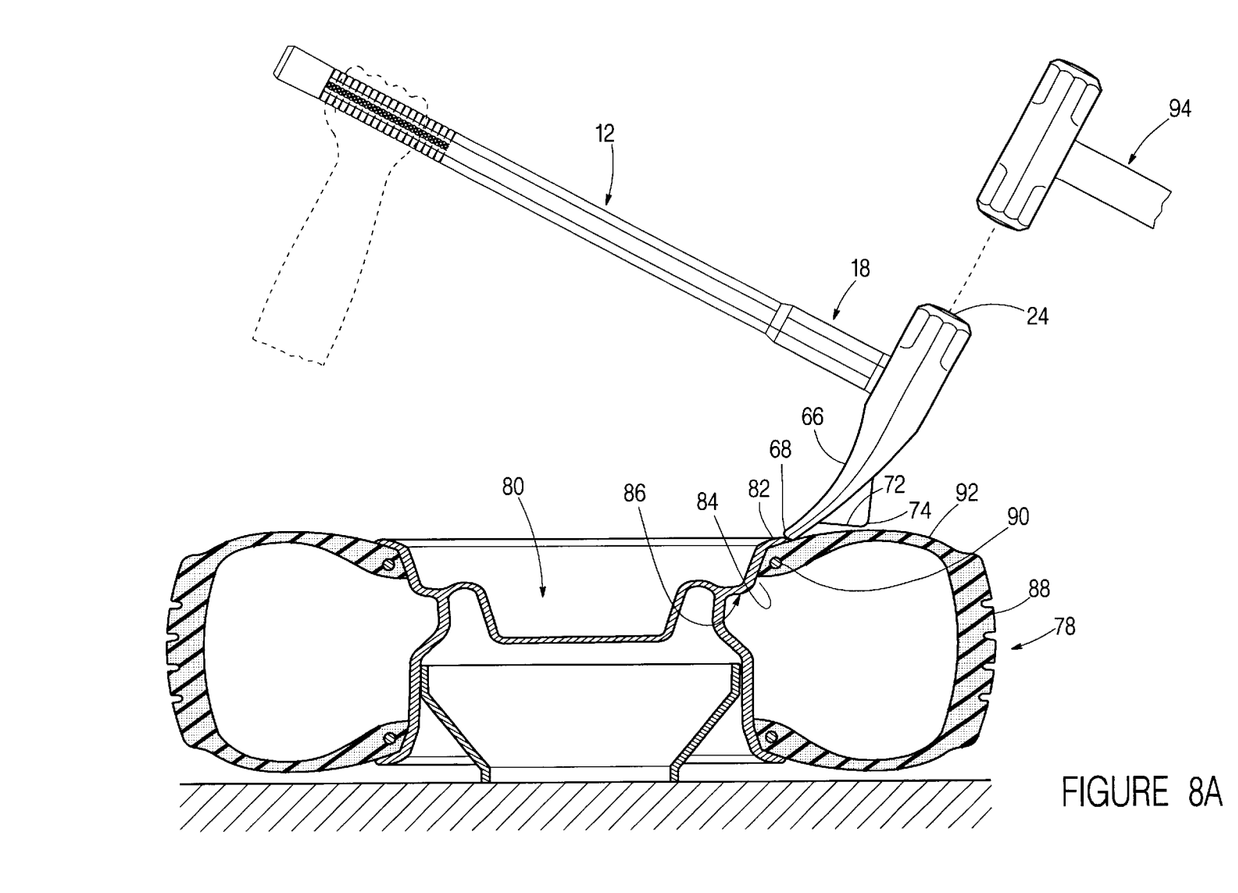
FIG. 8A is a side elevation view of the subject tire bead breaking wedge in an initial position in the tire bead breaking sequence, and showing a tire and wheel in transverse section.
Figure 8B:
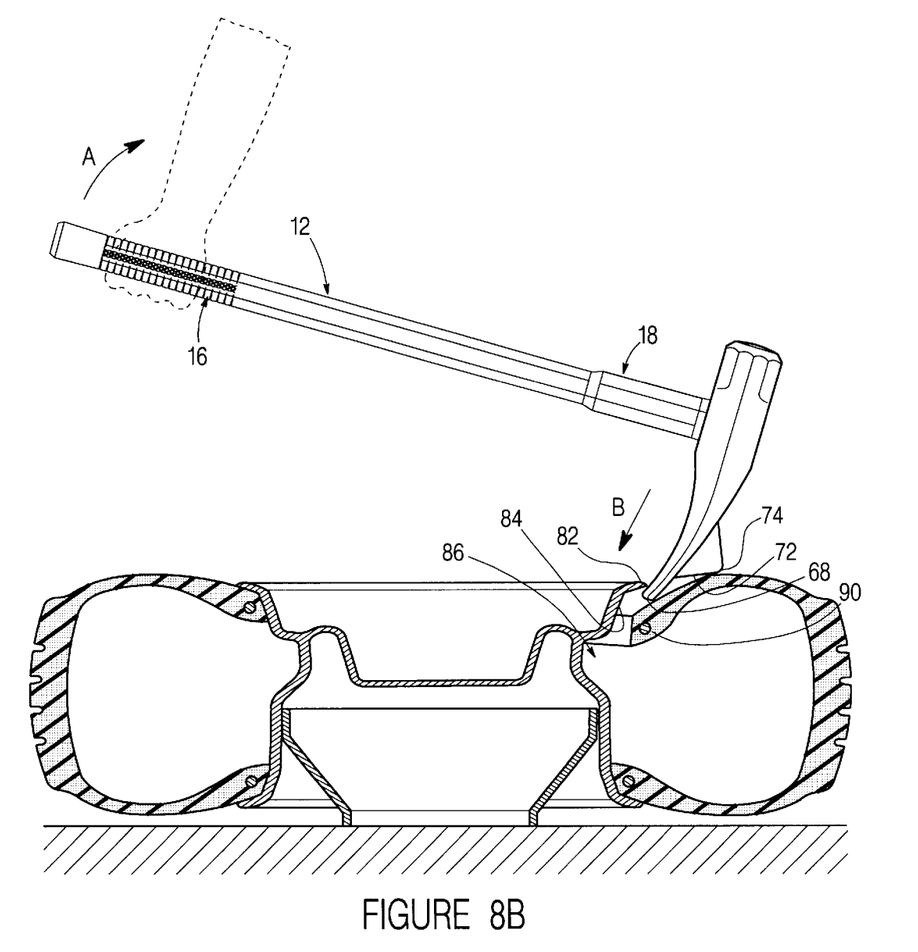
FIG. 8B is a side elevation view of the subject tire bead breaking wedge at a point subsequent to FIG. 8A at which the wedge protrusion engages against the tire bead.
Figure 8C:
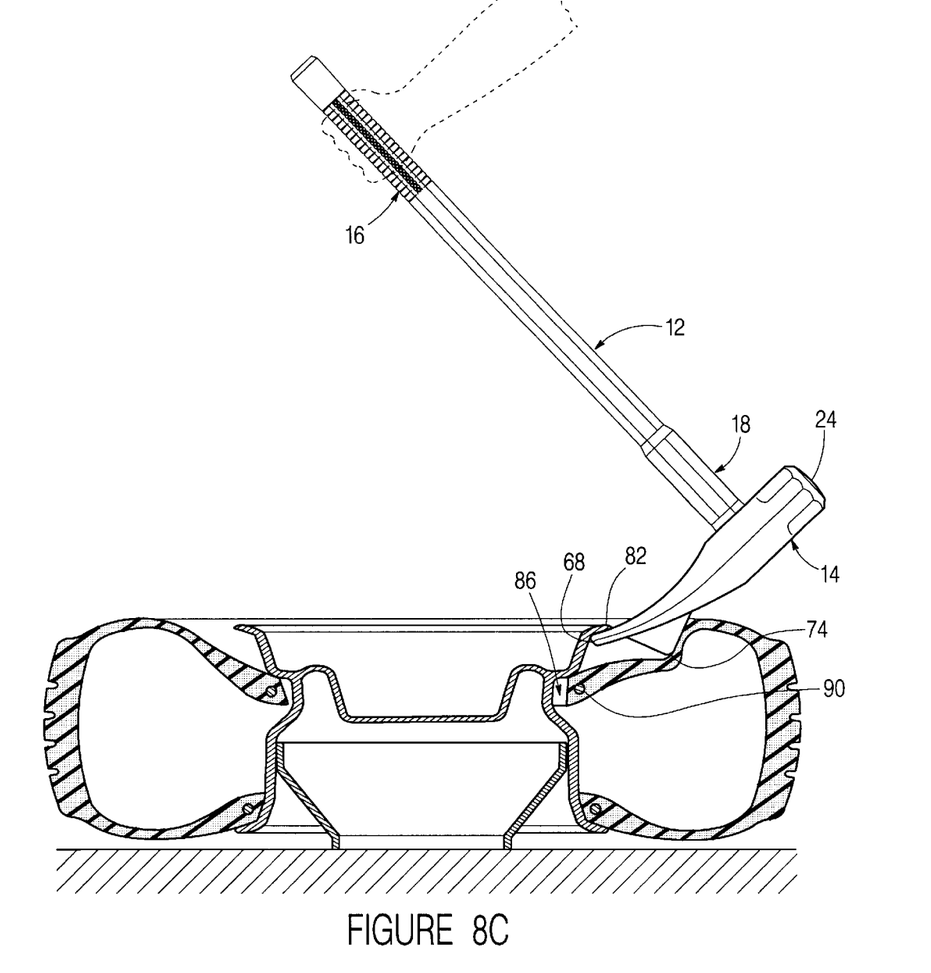
FIG. 8C is a side elevation view of the subject tire bead breaking wedge at a point subsequent to FIG. 8B at which separation of the tire bead from the wheel rim is complete.

FIGS. 8A–8C illustrate operation of the subject tire bead breaking wedge. The purpose of the tool is to demount a tire 78 from a wheel rim 80. The wheel rim is conventionally structured to include a peripheral rim edge 82 and an interior channel 86 connected to the edge 82 by an inclined surface 84. The tire is of common configuration, comprising an outward tread surface 88, an inner bead portion 90, and a sidewall portion 92 extending between the bead 90 and the tread 88. A mallet 94 is commonly used in conjunction with the use of the subject tool as will be appreciated from the following.

The lever arm is inverted into the position shown in FIG. 8A and the forward rounded edge 34 of the lever arm 32 is positioned between the tire bead 90 and the edge 82 of the wheel rim 80 with the handle 12 of the implement inclined at approximately forty-five degrees. Subsequently, the striking surface 24 of the wedge head is impacted by the mallet 94, driving the wedge arm edge 34 downward to a location against an underside of the wheel rim edge 82. Contact between the outward portion of forward edge 34 and surface 70 of lever arm 32 abutting against the tire bead 90 generally constitutes a first contact point or region.

Continued striking of the surface 24 with mallet 94 causes further downward movement of the wedge arm into a position relative to the tire and wheel rim depicted in FIG. 8B. At this point, the leading surface 72 of the protrusion 36 contacts an inboard portion of the tire bead 90. Contact between the protrusion 36 and bead 90 thus constitutes a second contact point or region that operates cooperatively thereafter with the first contact point established as set forth above between the forward edge 34 and surface 70 of lever arm 32 and the tire bead 90. The protrusion leading surface 72 is angled advantageously relative to the lever arm upper surface 70 to flatly impact the tire bead 90 so as not to cause damage to the tire.

At will be seen in FIG. 8B, the curved tip of the lever arm 32 at forward edge 34 allows edge 34 to catch against an underside of the wheel rim edge 82. Using the rim edge 82 as a fulcrum, the user then rotates the implement handle 12 in the direction "A". The lever arm 32 is thereby rotated clockwise and a downward force is applied at two regions to the tire bead 90 by the protrusion edge 74 and the lever arm edge 34 and surface 70. Thus, the lever arm 32 contacts the tire bead at two points of contact; namely, the protrusion edge 74 and edge 34 and surface 70 of the lever arm 32 proximate edge 34. The lever arm as a result deflects the tire bead 90 downward from the wheel rim edge 82. The dual points of contact between the lever arm and the tire bead 90, along the protrusion 36 and the lever arm forward edge 34 distribute leveraging force to two regions of the tire bead 90, rather than one, minimizing the risk of damage to the tire and minimizing the amount of force required from the operator to sufficiently deflect the tire bead downward.

The handle 12 of the implement is further rotated into the position shown in FIG. 8C. The protrusion 36 continues to apply force to the tire bead 90 and causes the tire bead to travel downward along rim surface 84 and into channel 86 where the tire bead remains trapped. Disengagement of the tire bead from the wheel rim is complete at this stage and the tool can be extracted from between the rim and tire. As will be appreciated from FIG. 8C, the gap between the tire bead 90 and the wheel rim edge 82 is considerable. Such a large gap allows for easy extraction of the tool lever arm 32 without requiring that the user pry the wedge head back and forth, as with prior art devices. Easy withdrawal of the tool is desirable for it reduces user fatigue. Moreover, eliminating or minimizing the need to pry the tool loose reduces the risk of damage to the tire.

It will be noted that the act of leveraging the tool against the tire bead is action directed along the longitudinal axis or plane of the head component 14. Such movement tends to work the head 14 further down the handle working portion 20 toward end 46, a movement that reinforces the press-fit frictional engagement between handle surfaces 48, 50 and sidewalls 30 of the bore 28. Thus, use of the wedge head 14 along its longitudinal plane serves to reinforce the connection between the handle and head. The head 14 will not, accordingly, require the user to separately reestablish its connection with the handle 12, as in prior art tire bead-breaking wedges.

It will be further appreciated that the wear caused by frictional engagement of working end 20 within bore 28 will occur along surfaces 48, 50. Because of the oblong configuration of the portion 20 in section, and the gaps 62, 64 between working portion surfaces 52, 54 and bore sidewalls 30 created thereby, surfaces 53, 54 will not be in contact with sidewalls 30. As end surfaces 48, 50 wear down from use of the tool, surfaces 48, 50 will remain the sole source of contact between working end 20 and the wedge head 14. The less protruding lateral surfaces 52, 54 will not evolve into becoming the sole or primary regions of contact between the handle and head as eventually occurs in state of the art handle and tool head configurations. In prior art tools, a wearing away of the working portion can lead to a situation where the lateral sides of the working portion are the sole surfaces contacting the sidewalls of the tool head bore. When that occurs, the head is connected to the handle along the lateral sides of the bore. A subsequent working of the tool back and forth along its longitudinal plane will cause a pivoting of the head about lateral surfaces 52, 53 of the handle working end. This "play", or rocking motion, results in a degradation in the mechanical advantage provided by the tool. Eventually, the head can further work its way loose from the handle since no reinforcement of the friction fit between the tool head and the lateral sides of the handle working portion will result from a working of the tool head along its longitudinal plane.

As a consequence, the working portion 20 of the present invention provides distinct advantages over the prior art. The invention not only provides a handle capable of establishing a positive frictional engagement within the bore of the tool head, but the handle further is configured to maintain a tight frictional connection through positive reinforcement of the connection through intended directional use of the tool head. Use of the tool, therefore, in its intended manner, self-tightens the frictional connection between the handle and the tool head.

Another advantage achieved by the invention is a handle that provides structural reinforcement to portions prone to contact with a wheel rim during use. The shield portion 18 is dimensioned in section larger than the gripping portion 16. Located proximate to the working end 20, the shield portion 18 may engage the wheel rim as the tool is wedged beneath the tire bead. The shield portion 18, due to its increased thickness relative to the gripping portion 16, can withstand repeated contact with the wheel rim without breaking.

As discussed previously, the wedge head of the subject invention provides significant advantages over the prior art. The placement of the protrusion 36 proximate to but offset from the wedge edge 34 allows the user to sequentially establish dual points of contact upon the tire bead. Application of leveraging force to two regions of the tire bead allows for easier bead deflection. Moreover, distributing the force to two regions eliminates concentration of such force that might otherwise cause damage to the tire. Further, the protrusion 36 is configured to provide a beveled leading surface 72 that engages the tire bead at a mechanically advantageous angle. Subsequent to separation of the bead from the tire rim, the tool is readily extracted without undue prying that might otherwise damage the tire.

The novel sequence of operation includes the steps of initiating separation between the tire bead and the wheel rim by positioning the remote tip of the tool head lever arm between the wheel rim and the tire bead, thus establishing a first point of contact with the tire bead. The head is then driven downward until the protrusion engages and establishes a second point of contact with the tire bead. The lever arm is thereafter rotated away from the wheel rim and pressures the tire bead downward at the first and second contact points until the bead disengages from the wheel rim.

A further advantage of the invention is that the head is economically and readily manufactured and readily connected to the tool handle. The joint between the head and handle can be effected manually and, as explained previously, is self-tightening as the tool is worked.

While the above describes the preferred embodiment of the invention, the invention is not intended to be so limited. Other embodiments, which will be apparent to those skilled in the art and which practice the teachings herein set forth, are intended to be within the scope and spirit of the invention.

What is claimed is:

1. A tire bead breaking wedge, comprising:
   an elongate handle having a gripping end and a working end;
   a wedge head affixed to the handle working end, the wedge head comprising an elongate wedge arm extending forward to a terminal edge and comprising oppositely directed inward and outward surfaces; and a bead breaking protrusion connected to project outward from the wedge arm outward surface proximate to the terminal edge of the wedge arm, the protrusion comprising a leading surface and a trailing surface intersecting the leading surface along a rounded edge.

2. A tire bead breaking wedge as set forth in claim 1, wherein the inward and outward surfaces of the wedge arm are curvilinear.

3. A tire bead breaking wedge as set forth in claim 1, wherein the inward and outward surfaces of the wedge arm converge toward the terminal edge.

4. A tire bead breaking wedge as set forth in claim 1, wherein the terminal edge is rounded.

5. A tire bead breaking wedge as set forth in claim 4, wherein the protrusion is offset a distance from the terminal edge.

6. A tire bead breaking wedge, comprising:

an elongate handle having a gripping end and a working end;

a wedge head affixed to the handle working end, the wedge head comprising an elongate wedge arm extending forward to a rounded terminal edge and comprising oppositely directed inward and outward surfaces; and a bead breaking protrusion connected to project outward from the wedge arm outward surface proximate to and offset a distance from the terminal edge of the wedge arm, the protrusion comprising a forwardly directed leading surface disposed to intersect a forward portion of the wedge arm outward surface at an intersection angle.

7. A tire bead breaking wedge as set forth in claim 6, wherein the intersection angle is obtuse.

8. A tire bead breaking wedge as set forth in claim 7, wherein the obtuse angle is substantially one hundred twenty degrees.

9. A tire bead breaking wedge as set forth in claim 1, wherein the protrusion is offset a distance from the terminal edge.

10. A tire bead breaking wedge as set forth in claim 9, wherein the protrusion comprises a forwardly directed leading surface disposed to intersect a forward portion of the wedge arm outward surface at an intersection angle.

11. A tire bead breaking wedge as set forth in claim 10, wherein the intersection angle is obtuse.

12. A tire bead breaking wedge, comprising:

an elongate handle having a gripping end and a working end;

a wedge head affixed to the handle working end, the wedge head comprising an elongate wedge arm extending forward to a terminal edge and comprising oppositely directed inward and outward surfaces;

a bead breaking protrusion connected to project outward from the wedge arm outward surface proximate to the terminal edge of the wedge arm, the protrusion is offset a distance from the terminal edge and comprises a forwardly directed leading surface disposed to intersect a forward portion of the wedge arm outward surface at an obtuse intersection angle and wherein the obtuse angle is substantially one hundred twenty degrees.

13. A tire bead breaking wedge, comprising:

an elongate handle having a gripping end and a working end;

a wedge head affixed to the handle working end, the wedge head comprising an elongate wedge arm extending forward to a terminal edge and comprising oppositely directed inward and outward surfaces;

a bead breaking protrusion connected to project outward from the wedge arm outward surface proximate to the terminal edge of the wedge arm, and wherein the wedge head includes a bore extending therein dimensioned to receive in press fit the working portion of the handle therein.

14. A tire bead breaking wedge as set forth in claim 13, wherein the wedge head bore is defined by sidewalls and the working portion of the handle is oblong in cross-section and includes oppositely directed protruding end surfaces and oppositely directed less-protruding lateral surfaces connected to the end surfaces.

15. A tire bead breaking wedge as set forth in claim 14, wherein the handle working portion end surfaces engage the sidewalls of the wedge head bore along a longitudinal plane of the wedge head.

16. A tire bead breaking wedge head comprising:

a forwardly directed elongate wedge arm extending forward to a terminal edge and comprising oppositely directed inward and outward surfaces;

and a bead breaking protrusion connected to project outward from the wedge arm outward surface proximate to the terminal edge of the wedge arm;

the protrusion comprises a leading surface and a trailing surface intersecting the leading surface along a rounded edge.

17. A tire bead breaking wedge as set forth in claim 16, wherein the inward and outward surfaces of the wedge arm are curvilinear.

18. A tire bead breaking wedge as set forth in claim 16, wherein the inward and outward surfaces of the wedge arm converge toward the terminal edge.

19. A tire bead breaking wedge as set forth in claim 18, wherein the terminal edge is rounded.

20. A tire bead breaking wedge as set forth in claim 19, wherein the protrusion is offset a distance from the terminal edge.

21. A tire bead breaking wedge head comprising:

a forwardly directed elongate wedge arm extending forward to a rounded terminal edge and comprising oppositely directed inward and outward surfaces;

and a bead breaking protrusion connected to project outward from the wedge arm outward surface proximate to and offset a distance from the terminal edge of the wedge arm; and the inward and outward surfaces of the wedge arm converging toward the terminal edge; and wherein the protrusion comprises a forwardly directed leading surface disposed to intersect a forward portion of the wedge arm outward surface at an intersection angle.

22. A tire bead breaking wedge as set forth in claim 21, wherein the intersection angle is obtuse.

23. A tire bead breaking wedge as set forth in claim 22, wherein the obtuse angle is substantially one hundred twenty degrees.

24. A tire bead breaking wedge head as set forth in claim 22, wherein the protrusion further comprises a trailing surface intersecting the leading surface along a rounded edge.

25. A method for breaking a tire bead from a wheel rim utilizing a tire bead breaking wedge head of the type comprising an elongate wedge arm having oppositely directed inward and outward surfaces intersecting at a forward wedge arm edge and an outwardly projecting protrusion positioned proximate the wedge arm edge and comprising an outward rounded tire engaging protrusion edge; the method comprising the steps:
- positioning the terminal edge of the wedge arm between the wheel rim and the tire bead;
- establishing a first region of engagement between the wedge arm and a peripheral portion of the tire bead adjacent the wheel rim;
- moving the wedge arm downward a first distance between the tire bead and the wheel rim;
- engaging an inboard portion of the tire bead with the protrusion rounded edge to establish a second region of engagement between the wedge head and the tire bead;
- moving the wedge arm downward a second distance to press the tire bead downward at the first end and roll the protrusion rounded edge over the inboard portion of the tire bead at the second region of engagement.

26. A method according to claim 25 further comprising the steps:
- engaging the terminal edge of the wedge arm with a peripheral edge of the wheel rim; and
- using the terminal edge of the wedge arm as a fulcrum to leverage the wedge arm against the tire bead at the first and second regions of engagement.

* * * * *